(12) United States Patent
Lee et al.

(10) Patent No.: US 9,213,433 B2
(45) Date of Patent: Dec. 15, 2015

(54) DISPLAY PANEL FOR DISPLAY DEVICE

(71) Applicant: LG Display Co., Ltd., Seoul (KR)

(72) Inventors: KiJeong Lee, Gumi-si (KR); ChangHwan Seo, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 14 days.

(21) Appl. No.: 14/333,060

(22) Filed: Jul. 16, 2014

(65) Prior Publication Data
US 2015/0317019 A1 Nov. 5, 2015

(30) Foreign Application Priority Data

Apr. 30, 2014 (KR) .................. 10-2014-0052340

(51) Int. Cl.
| | |
|---|---|
| *G06F 3/0488* | (2013.01) |
| *G06F 3/041* | (2006.01) |
| *G06F 1/16* | (2006.01) |
| *G06F 3/044* | (2006.01) |

(52) U.S. Cl.
CPC ............. *G06F 3/0412* (2013.01); *G06F 1/16* (2013.01); *G06F 3/044* (2013.01)

(58) Field of Classification Search
CPC ..... G06F 3/044; G06F 3/0416; G06F 3/0418; G06F 3/0488; G06F 3/041; G06F 2203/04104; G06F 3/04883; G06F 3/0412; G06F 2203/04103; G06F 2203/04106; G06F 3/03545; G06F 2203/04111; G06F 3/04886; G09G 2300/0426; G09G 3/3611; G09G 3/32; G09G 3/3648
USPC .................................. 345/156, 173, 174, 175
See application file for complete search history.

(56) References Cited

U.S. PATENT DOCUMENTS

| | | | | |
|---|---|---|---|---|
| 2010/0060596 | A1* | 3/2010 | Whight ........................ | 345/173 |
| 2012/0113021 | A1* | 5/2012 | Liu et al. ..................... | 345/173 |
| 2013/0038556 | A1* | 2/2013 | Nakai .......................... | 345/173 |
| 2013/0207934 | A1* | 8/2013 | Jang et al. ................... | 345/174 |
| 2013/0285979 | A1* | 10/2013 | Liu .............................. | 345/174 |
| 2014/0313156 | A1* | 10/2014 | Tenuta ......................... | 345/174 |

* cited by examiner

*Primary Examiner* — Duc Dinh
(74) *Attorney, Agent, or Firm* — Fenwick & West LLP

(57) ABSTRACT

The present disclosure provides a display panel for a display device including a touch electrode divided into first touch unit sensors having a first size and second touch unit sensors having a second size different from the first size. When a horizontal or vertical size of a second touch unit sensor is compared with a first touch unit sensor, the vertical size of the second touch unit sensor is smaller than that of the first touch unit sensor when the horizontal size of the second touch unit sensor is larger than that of the first touch unit sensor and the horizontal size of the second touch unit sensor is smaller than that of the first touch unit sensor when the vertical size of the second touch unit sensor is larger than that of the first touch unit sensor. Therefore, an area deviation of touch unit sensors forming a touch electrode is minimized and thus uniform and superior touch performance may be provided.

20 Claims, 8 Drawing Sheets

DISPLAY PANEL FOR DISPLAY DEVICE

CROSS-REFERENCE TO RELATED APPLICATION

This application claims priority from and the benefit under 35 U.S.C. §119(a) of Korean Patent Application No. 10-2014-0052340, filed on Apr. 30, 2014, which is hereby incorporated by reference for all purposes as if fully set forth herein.

BACKGROUND

1. Field of Technology

The embodiments herein relate to a display panel for a display device, and particularly, a touch integrated display panel of which a touch electrode is positioned inside of a display panel of a display device.

2. Description of the Prior Art

Requirements for a display device displaying an image have been increasing in various forms according to development of information society. In recent times, various display devices such as a liquid crystal display (LCD) device, a plasma display panel (PDP) device, an organic light emitting diode display device (OLED) have been utilized.

Among these display devices, the LCD device includes an array substrate including a thin film transistor, an upper substrate including a color filter and/or a black matrix etc., and a liquid crystal layer formed between the array substrate and the upper substrate, and the LCD device is a device displaying an image by controlling an alignment state of the liquid crystal layer according to an electric field applied between both electrodes of a pixel area and controlling transmittance of light according to the alignment state of the liquid crystal in the liquid crystal layer.

A display panel of the LCD device is defined as an active area (an active area, AA) providing the image to a user and a non-active area (a non-active area, NA) which is a peripheral area of the active area, and the display panel is usually fabricated by combining a first substrate which is the array substrate in which a pixel area is defined due to forming of the thin film transistor etc. and a second substrate which is the upper substrate in which the black matrix and/or the color filter layer etc. are formed.

The array substrate or the first substrate in which the thin film transistor is formed includes a plurality of gate lines GL extending in a first direction and a plurality of data lines DL extending in a second direction perpendicular to the first direction, and a pixel area P is defined by each of the gate lines and the data lines. In the pixel area P, at least one of the thin film transistors is formed, and a gate electrode and the source electrode of each of the thin film transistors may be respectively connected to the gate line and the data line.

In addition, a gate driving unit (a gate driving circuit) and a data driving unit (a data driving circuit) are formed in the non-active area or outside of the display panel so as to respectively provide a gate signal and a data signal to each of the gate lines and the data lines for driving each of the pixels.

The gate driving circuit may be simultaneously formed on the non-active area of the active area in a process of forming various signal lines and the pixel of the display panel, and thus as a result, the gate driving circuit may be formed in a gate-in-panel (GIP) type of which the gate driving circuit is included inside of the display panel.

In addition, a recent display panel usually has a touch function sensing a touch input such as a stylus pen or a user finger, and a type of which a touch screen is fabricated separately from the display panel to be disposed on the display panel, a touch integrated display panel of which a touch electrode and so on required to recognize a touch are included in the display panel when the display panel is fabricated, and so on have been developed.

The touch integrated display panel is called an "in-cell touch", and in the touch integrated display panel, usually a common electrode (Vcom) providing a common voltage to a pixel of the display panel is processed in a specific type to be used as the touch electrode.

Meanwhile, the touch electrode is formed by dividing the common electrode in a size of a touch unit sensor having a uniform size, and the touch unit sensors are connected to a touch circuit unit through a touch electrode connection line.

The touch circuit unit measures a touch input signal, for example a capacitance change and so on, generated from some of the touch unit sensors to sense a touch position on the display panel.

At this time, the touch unit sensor is a unit of a touch electrode having a specific area for the touch recognition, the touch unit sensor is formed as a size of including several tens to several hundreds of the pixels, and a number of the touch unit sensors formed in horizontal and vertical directions in the whole active area may be usually defined as a touch channel number.

Meanwhile, a touch is usually measured by sensing a change of a capacitance, and the capacitance is a function with respect to an area of an electrode, therefore it is preferable that the sizes of the touch unit sensors are uniform in the whole display panel.

However, the sizes of the touch unit sensors may not be the same in the whole active area according to a resolution of the display panel, that is a pixel number in the horizontal and vertical directions, and an arrangement of the touch unit sensors and so on, and thus sensitivity of the touch recognition and touch accuracy may decrease.

SUMMARY

A touch type display panel having uniform touch performance is provided.

Another aspect of the embodiments herein is to provide a touch integrated display panel of which touch performance is superior by designing a touch unit sensor so that sizes of the touch unit sensors are substantially uniform, when a touch electrode is divided into a plurality of the touch unit sensors.

Another aspect of the embodiments herein is to provide a touch type display panel of which touch performance is uniform by placing a basic touch unit sensor of a basic area in a central area of an active area, placing a variable touch unit sensor of a variable area around the central area, and designing a touch electrode arrangement so that a size difference between the basic area and the variable area is minimized, when a touch electrode is divided into a plurality of the touch unit sensors.

Another aspect of the embodiments herein is to provide a touch type display panel of which an area deviation of touch unit sensors is not great by placing a basic touch unit sensor having a basic area in a specific area, placing a variable touch unit sensor having a variable area different from the basic area around the specific area, designing the variable touch unit sensor so that the size of the variable touch unit sensor of a horizontal or a vertical direction is greater or smaller than a size of the basic touch unit sensor in the horizontal or the vertical direction as 1 pixel or 2 pixels.

In one embodiment, a display panel of a display device comprises a touch electrode including a plurality of first touch unit sensors and a plurality of second touch unit sensors formed around the first touch unit sensors, the plurality of first touch unit sensors having a first length and a first width, and the plurality of second touch unit sensors having a second length that is distinct from the first length of the plurality of first touch unit sensors and a second width that is distinct from the first width of the plurality of first touch unit sensors. The second length of the plurality of second touch unit sensors is smaller than the first length of the plurality of first touch unit sensors if the second width of the plurality of second touch unit sensors is larger than the first width of the plurality of first touch unit sensors. The second length of the plurality of second touch unit sensors is larger than first length of the plurality of first touch unit sensors if the second width of the plurality of second touch unit sensors is smaller than the first width of the plurality of first touch unit sensors.

In one embodiment, a display panel for a display device comprises an active area that includes a number of pixels formed in a horizontal direction and a number of pixels formed in a vertical direction. The display panel comprises a touch electrode formed with a number of touch unit sensors in the active area, the touch unit sensors including a number of horizontal channels of the touch unit sensors in the horizontal direction and a number of vertical channels of the touch unit sensors in the vertical direction, wherein the touch unit sensor comprises a number of basic touch unit sensors formed in an area of the active area of the display panel, and variable touch unit sensors formed in the active area around the basic touch unit sensors. The basic touch unit sensors have a size of a basic horizontal unit pixel number and a basic vertical unit pixel number, and the variable touch unit sensors have a size of a variable horizontal unit pixel number and a variable vertical unit pixel number. The variable vertical unit pixel number is smaller than the basic vertical unit pixel number if the variable horizontal unit pixel number is larger than the basic horizontal unit pixel number, and wherein the variable vertical unit pixel number is larger than the basic vertical unit pixel number if the variable horizontal unit pixel number is smaller than the basic horizontal unit pixel number.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
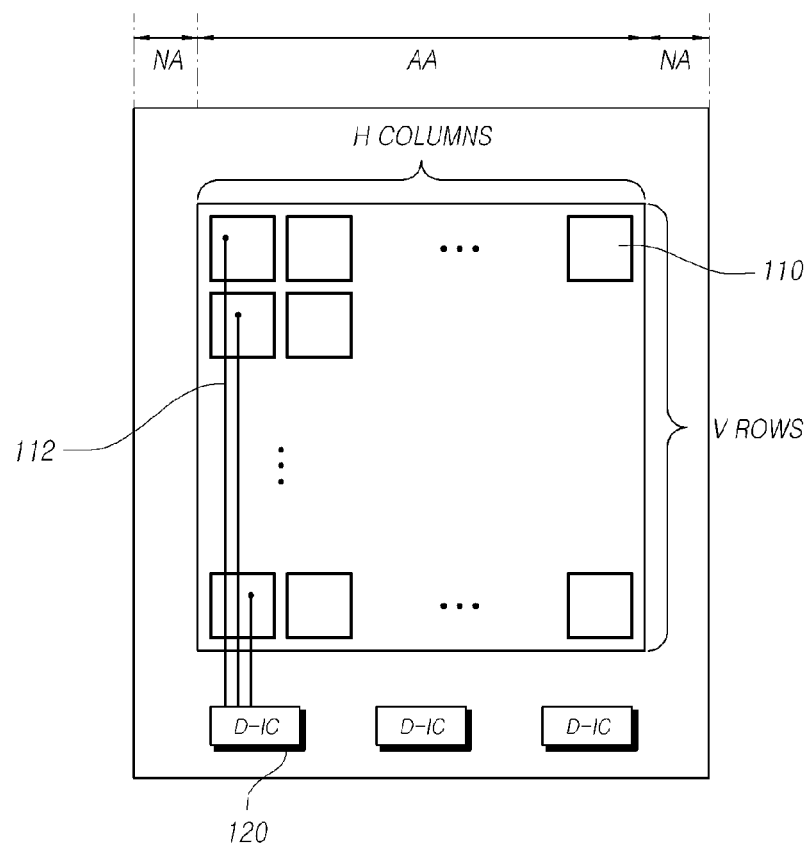
FIG. 1 is a plan view of a touch integrated display panel according to one embodiment.

Hereinafter, exemplary embodiments will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected", "coupled" or "joined" to another component, a third component may be "interposed" between the first and second components, although the first component may be directly "connected", "coupled" or "joined" to the second component.

FIG. 1 is a plan view of a touch integrated display panel according to one embodiment.

The display panel is a touch type display panel, more specifically, the display panel is a touch integrated (In-Cell) display panel of which a touch electrode is included inside of the display panel. Thus, the touch electrode is integrated in the display panel.

Such a display panel is fabricated by combining a first substrate which is an array substrate having a pixel area defined as a crossing area of a gate line and a data line and including at least one thin film transistor and a second substrate which is an upper substrate where a black matrix and/or a color filter layer and so on are formed.

Meanwhile, the display panel includes a plurality of common electrodes (Vcom) in an active area, and the common electrode is used to apply an electric field to a liquid crystal material by a voltage potential with a pixel electrode by applying a common voltage to the common electrode.

A normal display panel, such a common electrode (Vcom) may be formed as a single plane, in the touch integrated display panel, since the common electrode is used as a touch electrode for sensing a touch, the touch electrode is divided according to a touch position, and thus the common electrode is divided into a plurality of the touch electrodes in the active area as shown in FIG. 1.

At this time, a unit of division of the touch electrode is defined as a "touch unit sensor".

As shown in FIG. 1, the touch integrated display panel is divided into an active area (AA) of a central area and a non-active area NA around the central area, and the active area AA includes a plurality of touch unit sensors 110 which are the units of the touch electrode.

Each of the touch unit sensors 110 is connected to a data/touch driving unit (D-IC or T-IC) 120 disposed at a side of the display panel (e.g., a lower portion of FIG. 1) through a touch driving wire 112.

The data/touch driving unit 120 acts as a controlling unit sensing a touch position by sensing a capacitance due to a touch operation after applying a specific signal or a voltage to the touch unit sensors 110. In one embodiment, the touch driving unit is integrated to the data driving circuit (D-IC) therefore the touch driving unit is described as the data/touch driving unit 120, but it is not limited thereto, and the data driving unit and the touch driving unit may be separated in another embodiment.

Meanwhile, the display panel may include a gate-in-panel (GIP) driving unit of a GIP type which is directly formed on the display panel as a gate driving circuit at the non-active area NA of a side (a left side in FIG. 1) of the panel, but the exemplary embodiment is not limited thereto.

Meanwhile, as a touch method in the touch integrated display panel, a mutual capacitance method (Mutual Cap.) of which the touch electrode is divided into a touch electrode (TX) and a sensing touch (Rx) and a capacitance difference between the touch electrode (TX) and the sensing touch (Rx) is measured, and a self-capacitance method (Self Cap.) of which touch electrodes are disposed on the same plane in a lattice shape without division of a transmittance and reception and a self-capacitance is measured, etc. are possible.

Specially, in the mutual capacitance method and the self-capacitance method, the whole touch electrode is divided into a plurality of touch unit sensors 110.

The touch unit sensor 110 has a size of about several millimeters in each of the horizontal and vertical directions in consideration of a size of a touch finger and so on, therefore one touch unit sensor 110 usually has an area of covering several tens of or several hundreds of pixels.

When C number of pixels is formed in the horizontal direction and D number of pixels is formed in the vertical direction in the active area, the horizontal and vertical resolutions may be respectively defined. Further, the number of the touch unit sensors formed in the horizontal and vertical directions may be defined as numbers of horizontal touch channel H and vertical touch channel V, respectively. That is, the forming of the H number of the touch channels in the horizontal direction means the forming of the H number of the touch unit sensors in the horizontal direction.

In addition, the numbers of pixels included in one touch unit sensors in the horizontal and vertical directions may be respectively defined as a horizontal unit pixel number and a vertical unit pixel number, and for a convenience, the horizontal unit pixel number and the vertical unit pixel number are respectively displayed as M and N.

In these definitions, if sizes of all of the touch unit sensors are the same, C and D which are the above-mentioned horizontal and vertical resolutions are the same as a product of multiplication between the number H and V of the touch channels and the horizontal/vertical unit pixel number M and N, respectively, as noted from the following formula.

Horizontal resolution ($C$)=horizontal touch channel number ($H$)*horizontal unit pixel number ($M$); and Vertical resolution ($D$)=vertical touch channel number ($V$)*vertical unit pixel number ($N$) [Formula 1]

FIGS. 2A to 2E illustrate one type of a touch electrode design of the display panel according to one embodiment.

FIGS. 2A to 2E are based on an assumption that 1200 and 1920 pixels are formed in the horizontal and vertical directions, respectively, and the number of the horizontal channels and the number of vertical channels are 27 and 42, respectively.

That is, it is assumed that C and D which are the horizontal and vertical resolutions are 1200 and 1920, respectively, and that there are 27 divided touch electrodes in the horizontal direction and 42 divided touch electrodes in the vertical direction.

The example of the touch electrode design is for forming a touch unit sensor as a division unit having a size of about 3.5 mm to 5 mm in a rectangular shape. Thus, the number of the channels may be differently determined according to a size of the whole active area, the pixel number (the resolution) and so on.

For example, when it is assumed that the size of the touch unit sensor is uniformly (for example, 4 mm*4 mm) maintained, although the resolution is the same (the horizontal/vertical pixel number), the number of the touch channels may increase and the unit pixel number included in one touch unit sensor may decrease when the size (area) of the active area increases.

In this case, the numbers of the horizontal and vertical unit pixels included in the touch unit sensor may be 45 and 46, respectively.

A case that cannot satisfy formula 1 may occur according to the resolution, and FIGS. 2A to 2E correspond to an example of such a case.

That is, in the case of FIGS. 2A to 2E, the horizontal unit pixel number can be maintained uniformly as 45 up to the $26^{th}$ channel among 27 horizontal touch channels. However, the touch unit sensor of the last channel is formed with only 30 pixels other than 45 pixels. That is, the last touch unit sensor is formed with only 30 (1200−(26*45)=30) horizontal pixels.

The same circumstance also occurs in the vertical direction. The vertical pixel number of 46 is maintained up to the $41^{th}$ vertical channel among the 42 vertical channels. However, the last vertical channel touch sensor forms the touch unit sensor with only 34 (total 1920−(41*46)=34) vertical pixels.

That is, equally to the exemplary embodiment of FIGS. 2A to 2E, a case wherein the sizes of the touch unit sensors cannot be uniformly formed in the whole active area, that is, a case where the resolution is an integer times of the channel number or the unit pixel number occurs.

Figure 2A:
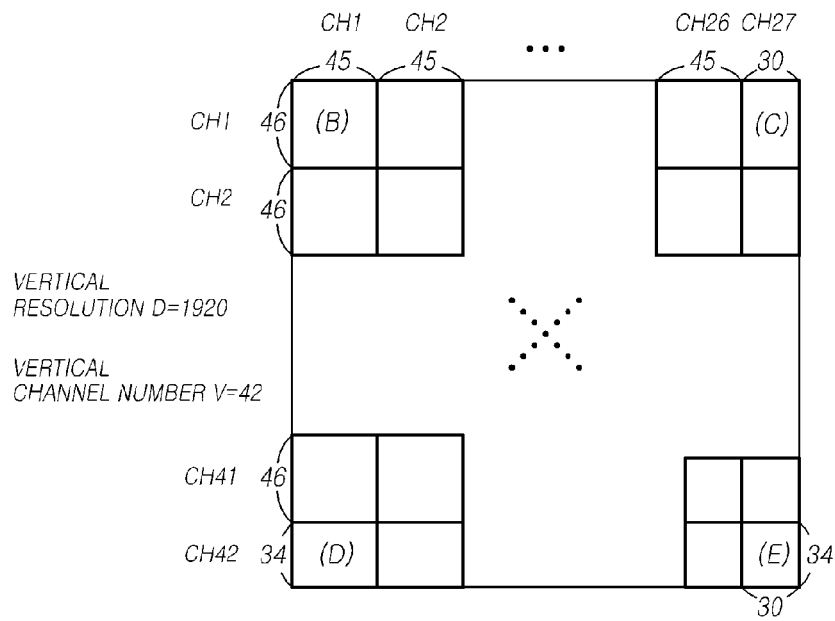
FIGS. 2A to 2E illustrate one type of a touch electrode design of the display panel according to one embodiment.
Figure 2B:
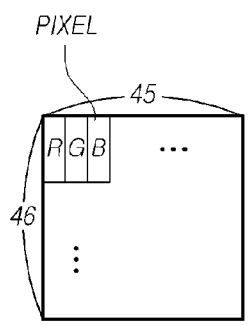
Figure 2C:
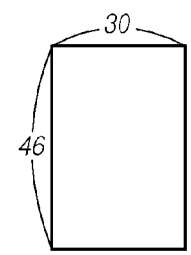

When such a circumstance occurs, the basic touch unit sensor forming most of the touch unit sensor is formed with a 45*46 pixel number which is the same size as shown in FIG. 2B, in the last horizontal channel, the first to the $(V-1)^{th}$ touch unit sensors in the vertical direction have a small size of a 30*46 pixel number, other than the 45*46 pixel number as shown in FIG. 2C.

Figure 2D:
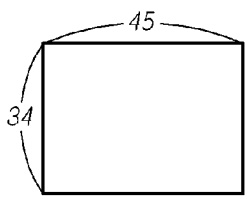

In the same manner, in the vertical direction also, the touch unit sensor is formed with the basic touch unit sensor having a 45*46 pixel number up to the $41^{th}$ channel. However, in the last vertical channel, the first to the $(H-1)^{th}$ touch unit sensors in the horizontal direction have a size smaller than the basic touch unit sensor, i.e. a 45*34 pixel number, other than the 45*46 pixel number as shown in FIG. 2D.

Figure 2E:
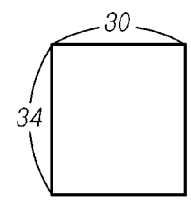

In addition, in a case of a touch unit sensor formed at the lowest portion of the right side in the display panel of FIGS. 2A to 2E, the touch unit sensor has a size of 30*34, which is much smaller than the basic touch unit sensor, other than the 45*46 as shown in FIG. 2E.

Figure 3:
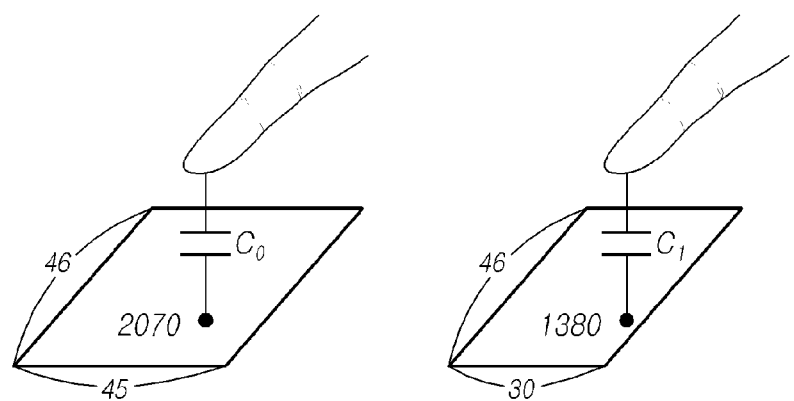
FIG. 3 illustrates a capacitance change in each of the touch electrodes in a case of FIGS. 2A to 2E according to one embodiment.
Figure 3:
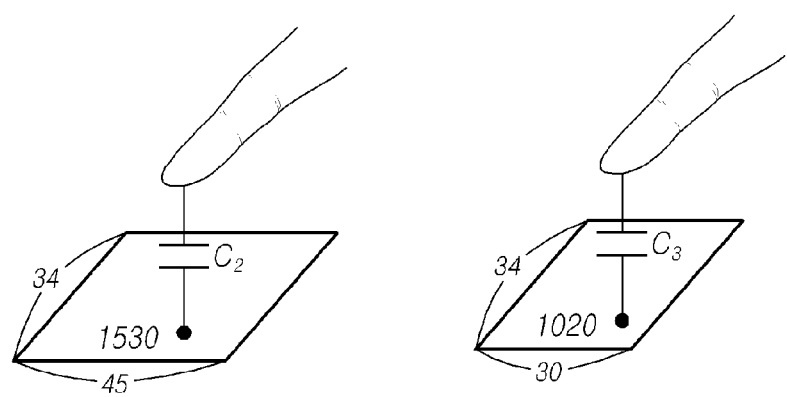
Figure 4A:
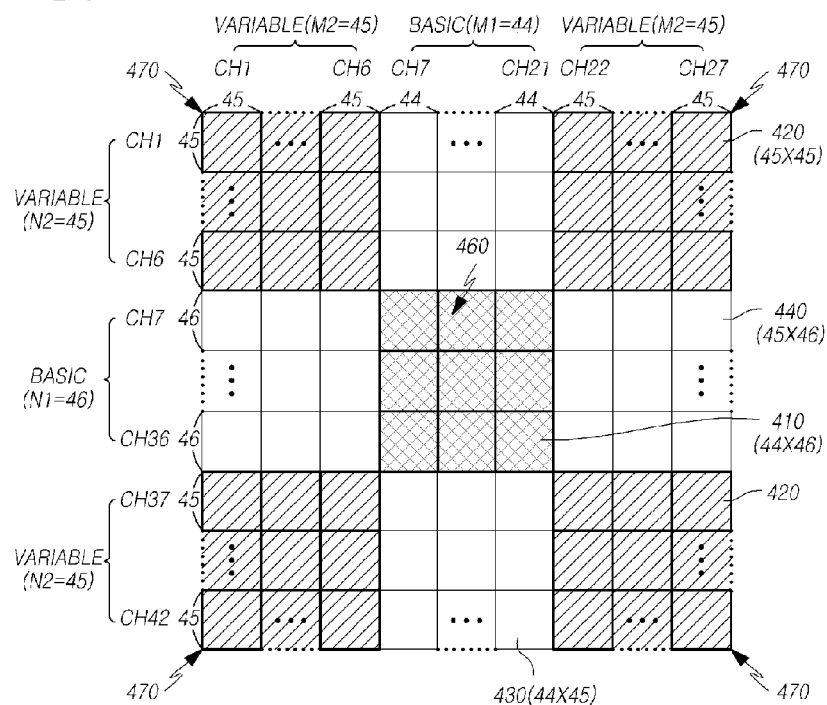
FIGS. 4A to 4E illustrate a touch electrode structure of the display panel according to one embodiment.
Figure 4B:
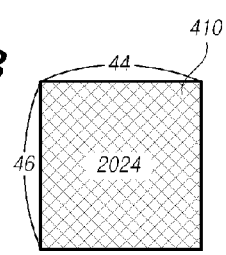
Figure 4C:
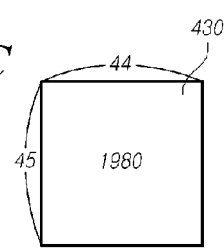
Figure 4D:
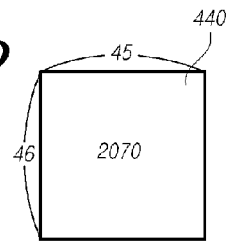
Figure 4E:
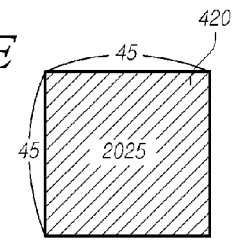
Figure 5A:
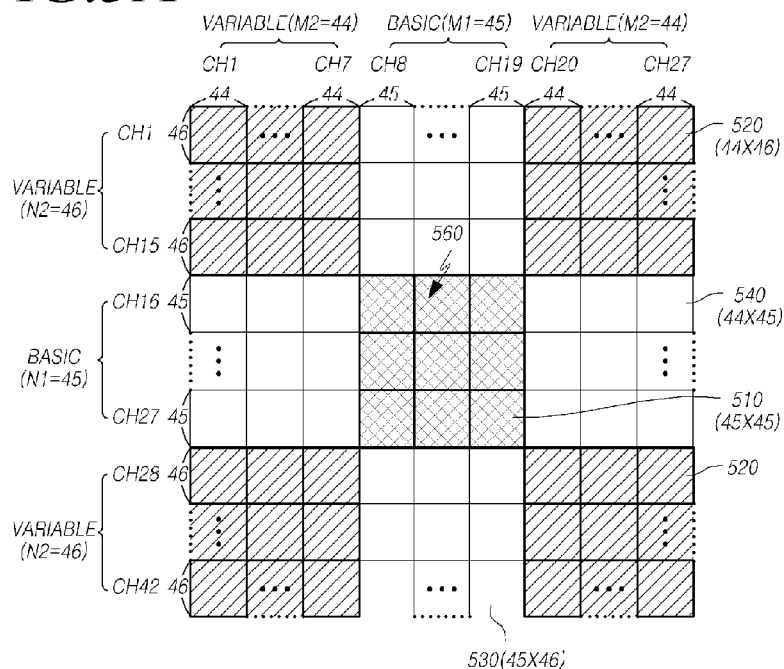
FIGS. 5A to 5E illustrate a touch electrode structure according to one embodiment.
Figure 5B:
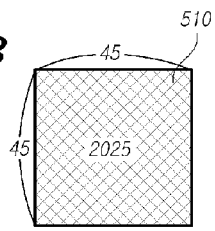
Figure 5C:
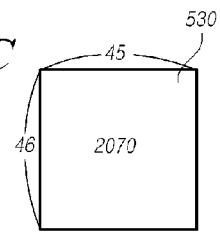
Figure 5D:
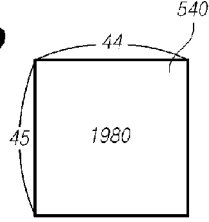
Figure 5E:
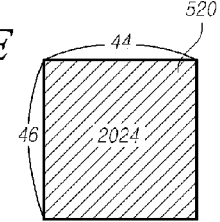
Figure 6A:
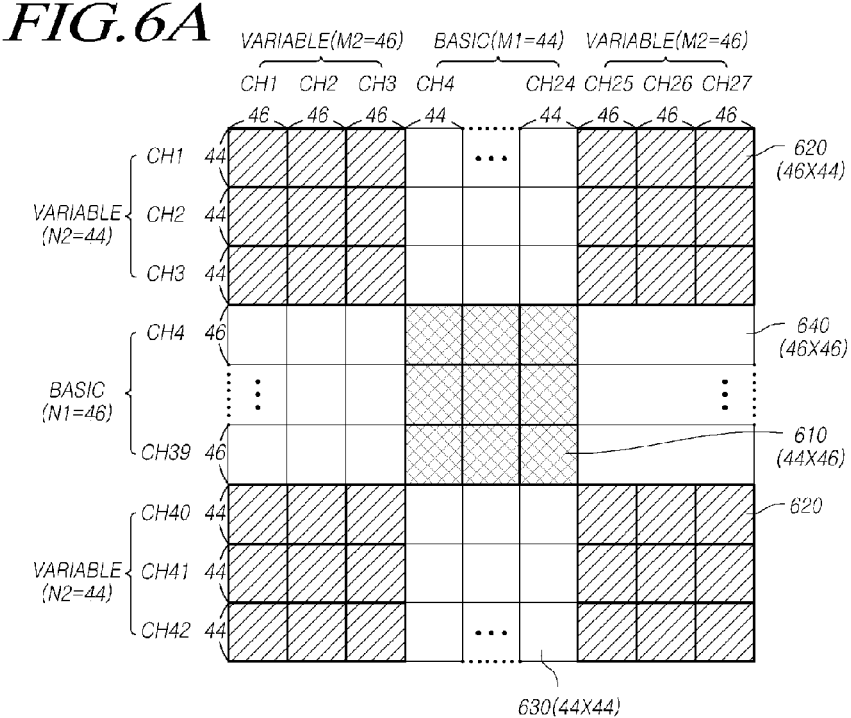
FIGS. 6A to 6E illustrate a touch electrode structure according to one embodiment.
Figure 6B:
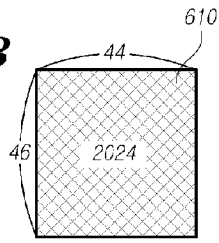
Figure 6C:
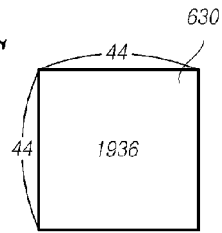
Figure 6D:
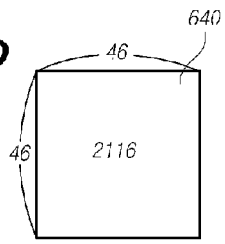
Figure 6E:
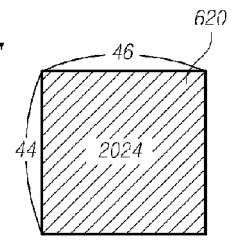

FIG. 3 illustrates a capacitance change in each of the touch electrodes in a case of FIGS. 2A to 2E.

Meanwhile, in the case of a touch sensor of the capacitance method, a touch is recognized by measuring the capacitance change between each of the touch unit sensors and a touch object (for example, a finger).

In addition, the capacitance is usually proportional to an area of a conductive material and is inversely proportional to a distance of both objects.

Thus, as shown in FIG. 3, there are differences among a capacitance change C0 in case a touch occurred in the basic touch unit sensor (45*46 size), a capacitance change C1 in case a touch occurred in a touch unit sensor (30*46 size) positioned at the last horizontal channel in a right direction, a capacitance change C2 occurred in a touch unit sensor (45*34 size) positioned at the lowest vertical channel and a capacitance change C3 occurred in a touch unit sensor (30*34 size) positioned at the lowest in the right direction, and so on.

Specifically, the touch unit sensor of the basic size has a size of 45*46=2070, in contrast, the other touch unit sensors positioned at edges respectively have sizes of 1380(30*46), 1530(45*34) and 1020(30*34). Thus, there is a difference of up to almost 50% based on the area of the basic unit sensor.

As described above, capacitance measurement values according to touches are different, especially when a user touches end areas of the right side or the lower side of the display panel, the measurement value thereof is different from that of other positions, and thus the accuracy of the touch recognition decreases.

In addition, although not shown, when the last horizontal or vertical touch unit sensor is formed larger than the basic touch unit sensor, differently from FIGS. 2A to 2E, a size of the touch unit sensor of the edge is larger than that of the basic touch unit sensor, and thus touch sensitivity is also not uniform.

In an exemplary embodiment, in order to solve this problem, the touch unit sensor is divided into basic touch unit sensors having a basic size and variable touch unit sensors having a size different from the basic size, the basic touch unit sensors are formed in a specific area of the panel and the variable touch unit sensors are formed around the basic touch unit sensors.

For example, the basic touch unit sensors may be formed in a central area of the panel, and the variable touch unit sensors may be formed around the central area such that the variable touch unit sensors are positioned to the left, right, above, and below the sides of the central area. That is, the variable touch unit sensors are formed at the corners of the active area of the display panel.

In addition, in comparison with a size of the basic touch unit sensor, the size of the variable touch unit sensor in the vertical direction is smaller than that of the basic touch unit sensor as the size of the variable touch unit sensor in the horizontal direction is larger than that of the basic touch unit sensor. In contrast, the size of the variable touch unit sensor in the horizontal direction is smaller than that of the basic touch unit sensor as the size of the variable touch unit sensor in the vertical direction is larger than that of the basic touch unit sensor. As a result, a deviation between an area of the variable touch unit sensor and an area of the basic touch unit sensor is minimized.

Specially, there is a difference of one pixel or two pixels between the size of the variable touch unit sensor and the basic touch unit sensor in the horizontal direction or in the vertical direction, and thus size deviation of the touch unit sensors is minimized.

Hereinafter, in the present specification, "horizontal" or "vertical" is for classifying for a convenience, they should be understood as a comprehensive meaning as a first direction and a second direction substantially perpendicular to the first direction not width/height meaning.

In one embodiment, "pixel" may mean one unit pixel including a color sub pixel of R, G, B and so on.

FIGS. 4A to 4E illustrate a touch electrode arrangement of the display panel according to one embodiment.

According to the embodiment in FIGS. 4A to 4E, the display panel includes an active area, which includes C number of pixels and D number of pixels formed in a horizontal direction and a vertical direction, respectively, and thus has a horizontal resolution of C and a vertical resolution of D. Further, the active area includes a touch electrode formed with H*V number of touch unit sensors formed due to division of H number of horizontal channels in the horizontal direction and V number of vertical channels in the vertical direction in the active area.

The touch unit sensor includes H'*V' number of basic touch unit sensors formed in a central area of the display panel and variable touch unit sensors formed around the basic touch unit sensor, the basic touch unit sensor has a size of a basic horizontal unit pixel number M1 and a basic vertical unit pixel number N1, and the variable touch unit sensor has a size of a variable horizontal unit pixel number M2 and a variable vertical unit pixel number N2.

Meanwhile, when the variable horizontal unit pixel number M2 is larger than the basic horizontal unit pixel number M1, the variable vertical unit pixel number N2 is smaller than the basic vertical unit pixel number N1, and when the variable horizontal unit pixel number M2 is smaller than the basic horizontal unit pixel number M1, the variable vertical unit pixel number N2 is larger than the basic vertical unit pixel number N1.

Hereinafter, the exemplary embodiment of FIGS. 4A to 4E is described using specific numerical value as an example.

It is assumed that the horizontal and vertical resolutions C and D are respectively 1200 and 1920, horizontal and vertical sizes of the active area are respectively 111.312 mm and 178.0992 mm, and numbers of the horizontal touch channel H and the vertical touch channel V are 27 and 42 similar to FIGS. 2A to 2E, respectively.

Usually, one touch unit electrode is formed with a size of about 3.5 to 5 mm, more preferably, about 3.9 to 4.3 mm in the horizontal and vertical directions in consideration of a size of a stylus pen or a finger which is a touch tool.

Thus, the numbers of the horizontal touch channel H and the vertical touch channel V may be set to quotients of horizontal/vertical lengths divided by a length of one side of the touch unit sensor. That is, in the above example, when the length of the one side of the touch unit sensor is about 4.1 mm, 27 which is the number of the horizontal touch channel may be determined by an integer value of a quotient (27.149) obtained by dividing 111.312, which is the length of the active area in the horizontal direction, by 4.1.

In this state, the basic touch unit sensor 410 is disposed in the central area of the active area, the variable touch unit sensors 420 are disposed around the central area, and FIGS. 4A to 4E show a state when the variable horizontal unit pixel number M2 is larger than the basic horizontal unit pixel number M1, the variable vertical unit pixel number N2 is smaller than the basic vertical unit pixel number N1.

When the horizontal resolution C and the vertical resolution D are respectively 1200 and 1920 and the numbers of the horizontal touch channels and the vertical touch channels are respectively 27 and 42, the basic horizontal unit pixel number M1 defining the size of the basic touch unit sensor 410 is set to 44 which is the same value as the quotient of 1200/27, and the basic vertical unit pixel number N1 is set to 46 which is larger by 1 than 45 corresponding to the quotient of 1920/42.

Then, the variable horizontal unit pixel number M2 defining the size of the variable touch unit sensor may be set to 45 which is larger by 1 pixel than 44 which is the basic horizontal unit pixel number M1. On the contrary, the variable vertical unit pixel number N2 may be set to 45 smaller by 1 pixel than 46 which is the basic vertical unit pixel number N1.

Of course, the variable unit pixel numbers M2 and N2 may be set so as to generate a difference of 2 or more pixels in comparison with the basic unit pixel numbers M1 and N1, instead of always generating a difference of one pixel.

Meanwhile, in this case, the variable touch unit sensors 420 having the size of 45*45 are disposed in 4 corners 470 which located above, below, left, and right of the central area 460 where the basic touch unit sensor 410 is formed.

In addition, at this time, the basic touch unit sensor 410 is disposed in a central H' number of channels among whole horizontal touch channel H number, and the variable touch unit sensor 420 are disposed in H-H' number of channels which are the total number of left and right sides of the central channels at both sides of the central channels.

At this time, a value of H-H' which is the number of the left and right channels where the variable touch unit sensors 420 are formed is determined as a difference value between the horizontal resolution value C and a product of the horizontal touch channel H and the basic horizontal unit pixel number M1. That is, the variable touch unit sensor is formed at channels of the number which is a remainder after filling the whole horizontal touch channel with the basic horizontal unit pixel number M1.

In the case of FIGS. 4A to 4E, the variable touch unit sensor is formed in 12 horizontal channels, the number of which is obtained by subtracting 1188(=27*44), i.e. the product of multiplication between the horizontal touch channel and the basic horizontal unit pixel number, from 1200 corresponding to the number of horizontal pixels. That is, as shown in FIGS. 4A to 4E, the variable touch unit sensor having a size of 45 corresponding to the variable horizontal unit pixel number M2 is formed in six left horizontal channels CH1 to CH6 and six right horizontal channels CH22 to CH27.

Of course, the total number of the channels H-H' where the variable touch unit sensor is formed is not absolutely limited to 12, for example, when the variable horizontal unit pixel number M2 is larger by 2 than the basic horizontal unit pixel number M1, the total number of channels where the variable touch unit sensors are formed may be 6.

FIGS. 5A to 5E correspond to one embodiment where there is a difference of two pixels between the variable unit pixel numbers M2 and N2 and the basic unit pixel numbers M1 and N1, which will be described in detail below.

Meanwhile, a medium touch unit sensor may be formed in addition to the basic touch unit sensor 410 of the central area 460 and the variable touch unit sensor 420 of the up, down, left and right areas 470 of the central area 460.

One of the horizontal unit pixel number and the vertical unit pixel number of the medium touch unit sensor is the basic unit pixel number and another means a unit sensor having the variable unit pixel number.

That is, in FIGS. 4A to 4E, a first medium touch unit sensor 430 having the basic horizontal unit pixel number (M1=44) and the variable vertical unit pixel number (N2=45), and a second medium touch unit sensor 440 having the variable horizontal unit pixel number (M2=45) and the basic vertical unit pixel number (N1=46) may be included.

For convenience, in the present specification, the variable touch unit sensor and the medium touch unit sensor are expressed, but the medium touch unit sensor may also be expressed as the variable touch unit sensor.

Table 1 below shows an arrangement type of the touch unit sensor shown in FIGS. 4A to 4E.

TABLE 1

Summary of the exemplary embodiment of FIGS. 4A to 4E

| | Item | | Specific numerical value | |
|---|---|---|---|---|
| | Horizontal | Vertical | Horizontal | Vertical |
| Active area size | A | B | 111 | 178 |
| Resolution (pixel number) | C | D | 1200 | 1920 |
| Pixel horizontal/vertical size | A/C | B/D | — | — |
| Touch channel number | H | V | 27 | 42 |
| Basic unit pixel number | M1 | N1 | 44 | 46 |

TABLE 1-continued

Summary of the exemplary embodiment of FIGS. 4A to 4E

| | Item | | Specific numerical value | |
|---|---|---|---|---|
| | Horizontal | Vertical | Horizontal | Vertical |
| Variable unit pixel number | M2 | N2 | 45 | 45 |
| Increase-or-not of variable unit sensor in comparison with basic unit sensor | +1 or −1 | +1 or −1 | Increase (+1) | Decrease (−1) |
| Left and right/up and down variable unit sensor formed channel number | | | 6 in each of left and right | 6 in each of up and down |

According to the above exemplary embodiment, as shown in FIGS. 4B to 4E, areas of the basic touch unit sensor 410, the variable touch unit sensor 420, the first medium touch unit sensor 430 and the second medium touch unit sensor 440 have only about 5% of deviation as shown in the following table. That is, areas of all of the touch unit sensors are almost uniform, therefore the capacitance change is uniform and thus the touch sensitivity and performance become superior.

TABLE 2

Size comparison of the touch unit sensors in the exemplary embodiment of FIGS. 4A to 4E.

| | Horizontal unit pixel number | Vertical unit pixel number | Area | Area deviation in comparison with basic |
|---|---|---|---|---|
| Basic touch unit sensor 410 | 44 | 46 | 2024 | — |
| First medium touch unit sensor 430 | 44 | 45 | 1980 | −2.2% |
| Second medium touch unit sensor 440 | 45 | 46 | 2070 | +2.3% |
| Variable touch unit sensor 420 | 45 | 45 | 2025 | +0.05% |

Specially, as shown in the above table, the basic touch unit sensor 410 is disposed in the central area of the panel, and thus touch performance in the central area of the panel where the touch operation is comparatively more may be uniformly maintained.

FIGS. 5A to 5E illustrate another embodiment, wherein, differently from FIGS. 4A to 4E, the size of the variable touch unit sensor is smaller than the basic touch unit sensor in the horizontal direction and the size of the variable touch unit sensor is larger by 1 pixel than the basic touch unit sensor in the vertical direction.

In the same manner, Table 3 below shows the exemplary embodiment of FIGS. 5A to 5E.

TABLE 3

Summary of the exemplary embodiment of FIGS. 5A to 5E

| | Item | | Specific numerical value | |
|---|---|---|---|---|
| | Horizontal | Vertical | Horizontal | Vertical |
| Active area size | A | B | 111 | 178 |
| Resolution (pixel number) | C | D | 1200 | 1920 |
| Pixel horizontal/vertical size | A/C | B/D | — | — |
| Touch channel number | H | V | 27 | 42 |
| Basic unit pixel number | M1 | N1 | 45 | 45 |

TABLE 3-continued

Summary of the exemplary embodiment of FIGS. 5A to 5E

| | Item | | Specific numerical value | |
|---|---|---|---|---|
| | Horizontal | Vertical | Horizontal | Vertical |
| Variable unit pixel number | M2 | N2 | 44 | 46 |
| Increase or not of variable unit sensor in comparison with basic unit sensor | +1 or −1 | +1 or −1 | Decrease (−1) | Increase (+1) |
| Left and right/up and down variable unit sensor formed channel number | | | Left 7, right 8 or left 8 and right 7 (asymmetry) | 15 in each of up and down (symmetry) |

In this case, contrary to the case of FIGS. 4A to 4E, the basic horizontal unit pixel number M1 of the basic channel unit sensor 510 is set to 45 larger by 1 than 44 which is a quotient obtained by dividing the horizontal resolution C by the horizontal channel number H, and the basic vertical unit pixel number N1 is set to 45 which is a quotient obtained by dividing the vertical resolution D by the vertical channel number.

In this case, the variable horizontal unit pixel number M2 of the variable touch unit sensor 520 is set to 44 smaller by 1 than 45 which is the basic horizontal unit pixel number M1, and the variable vertical unit pixel number N2 is set to 46 larger by 1 than 45 which is the basic vertical unit pixel number N1.

Meanwhile, a value of H-H', which corresponds to the total number of the channels where the variable touch unit sensors are formed in the horizontal direction, is 15 corresponding to a difference obtained by subtracting 1200, which is the horizontal resolution, from 1215(=27*45) which is a product of multiplication between the horizontal touch channel (H=27) and the basic horizontal unit pixel number (M1=45). That is, the basic touch unit sensors 510 are formed in 12 horizontal channels at the central area among the whole 27 horizontal channels, and the variable touch unit sensors 520 are formed in 15 horizontal channels disposed in the left and right sides of the central area.

At this time, since the number of the channels where the variable touch unit sensors are formed is an odd number, the variable touch unit sensors are formed in the left and right sides of the basic touch unit sensor asymmetrically, different from the exemplary embodiment of FIGS. 4A to 4E where the number of the channels in which the variable touch unit sensors are formed is an even number and thus the variable touch unit sensors are formed in the left and right sides of the basic touch unit sensor symmetrically.

That is, in the exemplary embodiment of FIGS. 5A to 5E, the variable touch unit sensor 520 is formed in 7 horizontal channels at the left side of the basic touch unit sensor, and the variable touch unit sensor 520 is formed in 8 horizontal channels at the right side of the basic touch unit sensor. Of course, the variable touch unit sensor may be formed in 8 channels at the left side and in 7 channels at the right side.

In addition, the variable touch unit sensor does not have to be formed symmetrically in the left and right sides or the up and down sides of the basic touch unit sensor, and in the case of FIGS. 5A to 5E, the variable touch unit sensor may be differently formed in 9 channels at the left side and in the 6 channels at the right side.

However, as described above, the variable touch unit sensor may be formed in the left and right sides or the up and down sides of the basic touch unit sensor symmetrically (in the case of forming an even number of the variable touch unit sensors) or symmetrically as much as possible (in the case of forming an odd number of the variable touch unit sensors) so as to place the basic touch unit sensor in the central area of the panel where touch frequency is comparatively as high as possible.

In addition, a value of V-V', which is the total number of the vertical channels where the variable touch unit sensors are formed in the vertical direction, is 30 corresponding to a difference between 1920, which is the vertical resolution, and 1890(=42*45), which is a product of multiplication between the vertical touch channel (V=42) and the basic vertical unit pixel number (N1=45). That is, the basic touch unit sensors 510 are formed in 12 vertical channels the central area among the whole 42 vertical channels, and the variable touch unit sensors 520 are formed in 15 vertical channels disposed in the up and down sides of the central area.

Table 4 shows an area ratio comparison of 4 kinds of touch unit sensors in the exemplary embodiment of FIGS. 5A to 5E.

TABLE 4

Size comparison of the touch unit sensors in the exemplary embodiment of FIGS. 5A to 5E

| | Horizontal unit pixel number | Vertical unit pixel number | Area | Area deviation in comparison with basic |
|---|---|---|---|---|
| Basic touch unit sensor 510 | 45 | 45 | 2025 | — |
| First medium touch unit sensor 530 | 45 | 46 | 2070 | +2.3% |
| Second medium touch unit sensor 540 | 44 | 45 | 1980 | −2.2% |
| Variable touch unit sensor 520 | 44 | 46 | 2024 | −0.05% |

When the exemplary embodiment of FIGS. 4A to 4E and the exemplary embodiment of FIGS. 5A to 5E are compared with each other, all of the area deviations of the touch unit sensors are uniformly maintained, but the forming ratio of the basic touch unit sensor in the exemplary embodiment of FIGS. 5A to 5E is lower than that of the basic touch unit sensor in the exemplary embodiment of FIGS. 4A to 4E.

The exemplary embodiment of FIGS. 4A to 4E may be more preferable because the greater ratio of the basic touch unit sensor, that is the lesser forming ratio of the variable touch unit sensor is more preferable.

That is, in the basic horizontal unit pixel number M1 and the basic vertical unit pixel number N1, which value is to be selected between the same value as the quotient, which is obtained by dividing the horizontal resolution C and the vertical resolution D by the horizontal channel number H and the vertical channel number V, respectively, and a vale larger by 1 than the quotient, resultantly depends on which method has a lower ratio of forming the variable touch unit sensor.

FIGS. 6A to 6E illustrate another embodiment. In the embodiment of FIGS. 6A to 6E, there is a difference of 2 pixels between the variable unit pixel numbers M2 and N2 and the basic unit pixel numbers M1 and N1.

That is, in the embodiment of FIGS. 4A to 4E, there is a 1 pixel difference between the variable unit pixel numbers M2 and N2 and the basic unit pixel numbers M1 and N1, while the exemplary embodiment of FIGS. 6A to 6E shows a case where there is a difference of 2 pixels between the variable unit pixel numbers M2 and N2 and the basic unit pixel numbers M1 and N1.

Table 5 below shows the exemplary embodiment of FIGS. 6A to 6E similarly to the table of FIGS. 4A to 4E.

TABLE 5

Summary of the exemplary embodiment of FIGS. 6A to 6E

| | Item | | Specific numerical value | |
|---|---|---|---|---|
| | Horizontal | Vertical | Horizontal | Vertical |
| Active area size | A | B | 111 | 178 |
| Resolution (pixel number) | C | D | 1200 | 1920 |
| Pixel horizontal/vertical size | A/C | B/D | — | — |
| Touch channel number | H | V | 27 | 42 |
| Basic unit pixel number | M1 | N1 | 44 | 46 |
| Variable unit pixel number | M2 | N2 | 46 | 44 |
| Increase or not of variable unit sensor in comparison with basic unit sensor | +2 or −2 | +2 or −2 | Increase (+2) | Decrease (−2) |
| Left and right/up and down variable unit sensor formed channel number | | | 3 in each of left and right | 3 in each of up and down |

That is, in the exemplary embodiment of FIGS. 6A to 6E, the unit pixel number of the variable touch unit sensor increases or decreases by 2 in comparison with the unit pixel number of the basic unit sensor. Therefore, the basic touch unit sensors 610 of which the basic horizontal unit pixel number M1 is 44 are formed in the central area of 21 channels among the whole 27 channels and the variable touch unit sensors 620 of which the variable horizontal unit pixel number M2 is 46 are formed in 3 horizontal touch channels disposed in each of the left and right sides of the central area, in the horizontal direction.

In the same manner, the basic touch unit sensors 610 of which the basic vertical unit pixel number N1 is 46 are formed in the central area of 36 channels among the whole 42 channels, and the variable touch unit sensors 620 of which the variable vertical unit pixel number N2 is 44 are formed in 3 vertical touch channels disposed in each of the up and down sides of the central area, in the vertical direction too.

Table 6 below shows an area ratio comparison between 4 kinds of the touch unit sensors in the exemplary embodiment of FIGS. 6A to 6E.

TABLE 6

Size comparison of the touch unit sensors in the exemplary embodiment of FIGS. 6A to 6E

| | Horizontal unit pixel number | Vertical unit pixel number | Area | Area deviation in comparison with basic |
|---|---|---|---|---|
| Basic touch unit sensor 610 | 44 | 46 | 2024 | — |
| First medium touch unit sensor 630 | 44 | 44 | 1936 | −4.3% |
| Second medium touch unit sensor 640 | 46 | 46 | 2116 | +4.5% |
| Variable touch unit sensor 620 | 46 | 44 | 2024 | 0% |

In the exemplary embodiment of FIGS. 6A to 6E also, the area deviation of the touch unit sensors is formed within about 5%, too. Comparing with the exemplary embodiment of FIGS. 4A to 4E, in the exemplary embodiment of FIGS. 6A to 6E, the area deviation of the touch unit sensors increases, but the area of the basic touch unit channel in the whole active area increases.

That is, when the unit pixel number difference between the variable touch unit sensor and the basic touch unit sensor increases, there are merits of decrease of forming ratio of the variable touch unit sensor, but there are defects of increase with the area deviation of the touch unit sensors.

Thus, the unit pixel number difference of the variable touch unit sensor and the basic touch unit sensor may be determined in consideration of this synthetically.

According to the embodiments herein, when the touch electrode is divided into the plural touch unit sensors, the basic touch unit sensor having the same size of the basic area is disposed in the central area of the active area, the variable touch unit sensor of the variable area is disposed around the central area, the touch electrode arrangement is designed so that the size difference between the basic area and the variable area is minimized, and thus there is an effect of maintaining the touch performance uniformly.

In addition, in forming the variable touch unit sensor, the size of the variable touch unit sensor decreases in the vertical direction when the size of the variable touch unit sensor increases in the horizontal direction, on the contrary, the size of the variable touch unit sensor decreases in the horizontal direction when the size of the variable touch unit sensor increases in the vertical direction, in comparison with the basic touch unit sensor, as a result, the deviation between the area of the variable touch unit sensor and the area of the basic touch unit sensor is minimized, and thus superior touch performance may be provided.

In addition, the embodiments herein may be applied to the self-capacitance method among the touch integrated display panels, but it is not limited thereto.

That is, in the self-capacitance method, all touch unit sensors are used as measurement sensing electrodes, therefore, when the exemplary embodiment is applied to the self-capacitance method, the solution of the problem of the touch performance decreases according to the area change of the touch unit sensors is directly expected.

However, in the touch panel of the mutual-capacitance method of measuring the capacitance between the driving touch electrode (Tx) and the measurement (reception) touch electrode (Rx), when the exemplary embodiment is applied to at least one of the driving touch electrode (Tx) and the measurement touch electrode (Rx), it is determined that a certain effect may occur, too.

In the exemplary embodiments of FIGS. 4 to 6 as the same above, the basic touch unit sensor is disposed in the central area of the active area, and the variable touch unit sensor is disposed in around the central area, but it is not limited thereto.

That is, when the area deviation between the basic touch unit sensor and the variable touch unit sensor is not great, the basic touch unit sensor may be formed in a peripheral area, for example an upper area of the left side, of the active area, and the variable touch unit sensors may be disposed in a lower area of the right side of the central area.

Figure 7:
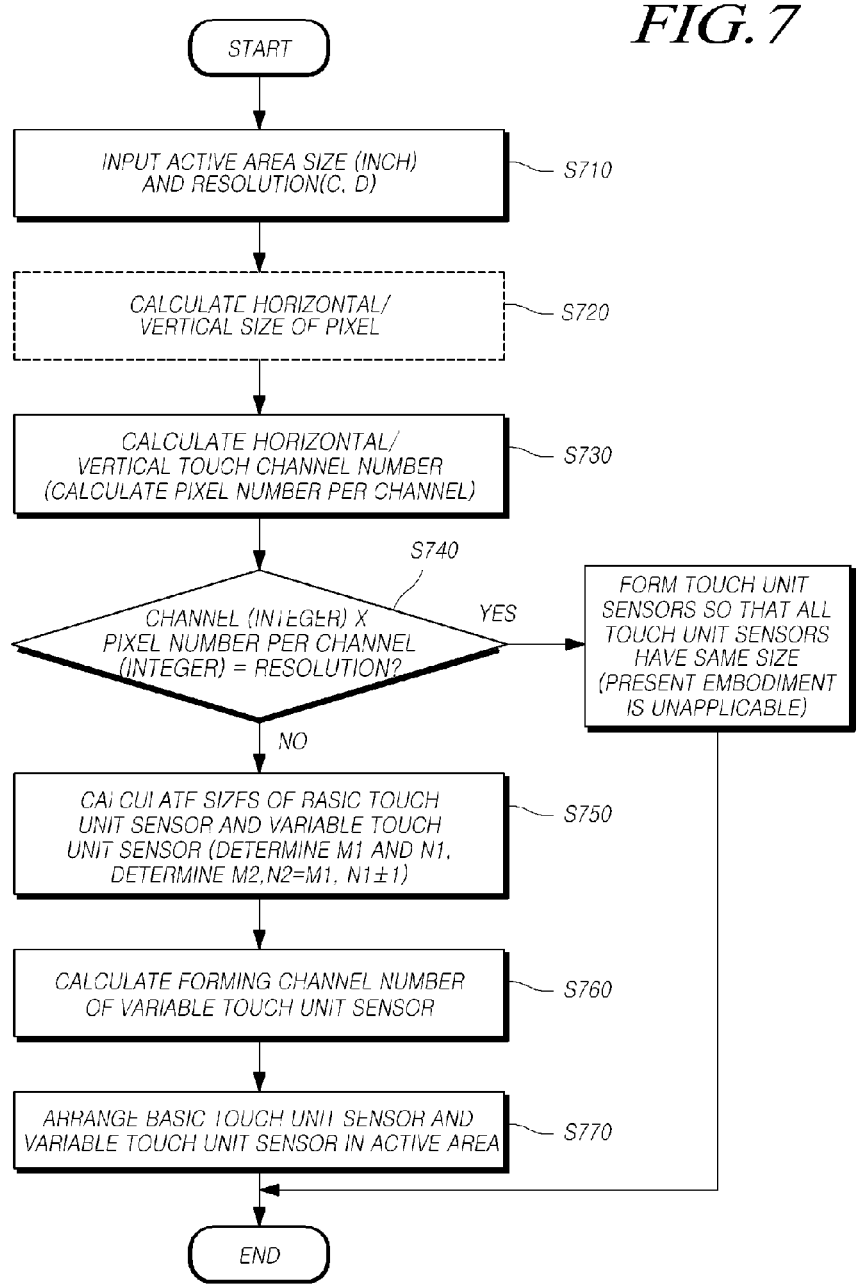
FIG. 7 is a flow chart illustrating a method of forming a variable touch unit sensor according to one embodiment.

FIG. 7 is a flowchart illustrating a method of forming the variable touch unit sensor according to one embodiment.

That is, FIG. 7 illustrates a mechanism (or algorithm) for dividing/arranging the basic touch unit sensor and the variable touch unit sensor according to a structure (the resolution, the size of the active area, the pixel number and so on) of the touch integrated display panel.

FIG. 7 illustrates a case that there is 1 a pixel difference between the variable unit pixel number and the basic unit pixel number, but it is not limited thereto.

First, the size of the active area of the display panel (the horizontal and vertical directions) and the resolutions (the sum pixel number of the horizontal and vertical directions) are input (S710). The size of the active area and the resolution are parameters determined in advance in a process of fabrication/design of the display panel.

Then, horizontal and vertical sizes of each of the pixels are calculated (S720). The horizontal and vertical sizes of each of the pixels are quotients of the horizontal size and the vertical size of the active area respectively divided by the horizontal resolution and the vertical resolution.

Next, the numbers of the horizontal touch channel and the vertical touch channel are calculated according to the size of the necessary touch unit sensor, the pixel number included in each of the touch channels may be further calculated (S730). That is, a square of about 3.9 to 4.3 mm is determined as the size of the touch unit sensor according to a kind of the touch tool such as the stylus pen, the finger and so on, a value of the horizontal or vertical size of the active area divided by one of about 3.9 to 4.3 mm which is the size of the touch unit sensor is the number of the horizontal/vertical touch channels. At this time, it is assumed that the number of the horizontal or vertical touch channel is an integer.

In addition, the pixel number included in each of the touch channels may be determined as the horizontal and vertical resolutions (that is, the horizontal or vertical pixel number) divided by the numbers of the horizontal and the vertical touch channels, respectively.

Next, it is determined that the variable touch unit sensor according to the exemplary embodiment of the present invention is necessary. That is, it is determined that the product of multiplication between the number of the touch channel and the number of the pixel per channel exactly corresponds to the resolution (S740). Such step S740 is a concept the same as checking whether the pixel number per channel which is the resolution divided by the number of the channel exactly corresponds to the integer in step S730.

If a product of multiplication between the number of the touch channel and the number of the pixel per channel corresponds to the resolution, the sizes of all of the touch unit sensors are the same, and thus the exemplary embodiments described herein are not applied to this case.

However, if a product of multiplication between the number of the touch channel and the number of the pixel per channel does not correspond to the resolution, the basic touch unit sensor and the variable touch unit sensor should be classified and arranged according to the embodiments herein.

Thus, the sizes of the basic touch unit sensor and the variable touch unit sensor are determined (S750).

That is, the quotient obtained by dividing the resolution by the touch channel with respect to one of the horizontal and vertical directions is determined as the basic unit pixel number M1 or N1 of the basic touch unit sensor, the variable unit pixel number N2 or M2 is determined as a value larger by 1 than the basic unit pixel number. On the contrary, a value larger by 1 than the quotient obtained by dividing the resolution by the touch channel with respect to another of the horizontal and vertical directions is determined as the basic unit pixel number of the basic touch unit sensor, and the variable unit pixel number is determined as the value smaller by 1 than the basic unit pixel number.

For example, as noted from the example of FIGS. 4A to 4E, 44 which is the quotient obtained by dividing the horizontal resolution, i.e. 1200, by the horizontal touch channel, i.e. 27, may be determined as the basic horizontal unit pixel number, and 46 which is larger by 1 than 45 which is the quotient obtained by dividing the vertical resolution, i.e. 1920, by the vertical touch channel, i.e. 42, may be determined as the basic vertical unit pixel number. That is, the size of the basic touch unit sensor is 44*46.

In this case, the variable horizontal unit pixel number is 45 larger by 1 than 44 of the basic horizontal unit pixel number, and the variable vertical unit pixel number is 45 smaller by 1 than the basic vertical unit pixel number. Thus, the size of the variable touch unit sensor is 45*45.

Next, the total number of the channels where the variable touch unit sensor is disposed among the horizontal and vertical channels is calculated (S760).

The total number of the horizontal and vertical channels where the variable touch unit sensor should be disposed may be determined as the following formula 2.

Formed channel number of variable touch unit sensor=|resolution−(total number of channels*basic unit pixel number)|     [Formula 2]

That is, the formed channel number of the variable touch unit sensor in the horizontal and vertical directions corresponds to the absolute value of a difference between a resolution and a product of multiplication between the channel number and the basic unit pixel number.

For example, when the horizontal resolution is 1200, the horizontal touch channel number is 27 and the basic horizontal unit pixel number is 44, 12(=1200−(27*44)) is the number of channels where the variable touch unit sensors should be formed in the horizontal direction. That is, the basic touch unit sensor is formed in 15 channels among the whole 27 horizontal touch channels, and the variable touch unit sensor is formed in 12 channels.

In the same manner, the variable touch unit sensors should be formed in 12(=42*46−1920) vertical channels in the vertical direction.

Next, the basic touch unit sensor and the variable touch unit sensor are properly disposed in the active area (S770).

That is, as shown in the example of FIGS. 4A to 4E, the basic touch unit sensors may be disposed in the central area of the active area, and the variable touch unit sensor may be disposed around the central area symmetrically as much as possible. That is, the basic touch unit sensors are formed in an area having a size of 12 horizontal channels and 30 vertical channels in the central area of the active area, and the variable touch unit sensors are formed on 6 horizontal channels disposed in each of the left and right sides of the central area and on 6 vertical channels disposed in each of the up and down sides of the central area.

Figure 8A:
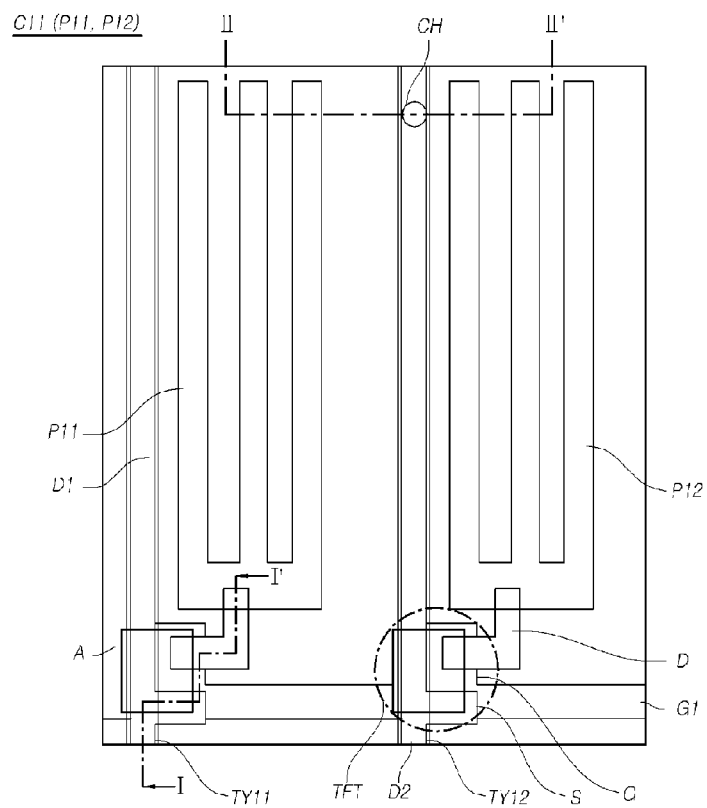
FIGS. 8A and 8B illustrate an example of a basic structure of a display panel to which an exemplary embodiment of the present invention may be applied.
Figure 8B:
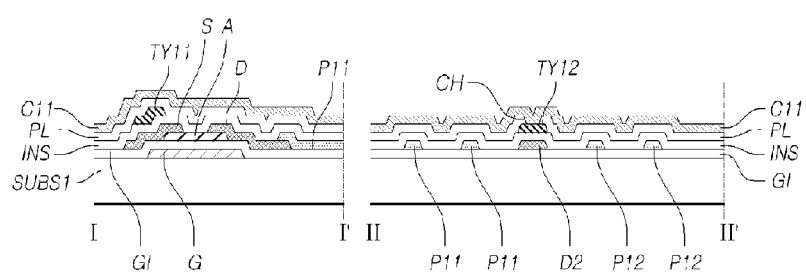

FIGS. 8A and 8B illustrate an example of a basic structure of a display panel according to one embodiment.

However, a display panel to which the embodiments herein may be applied to is not limited to the following example.

A touch type display panel to which one embodiment may be applied includes a gate line G1 formed on a first substrate SUBS1 and a gate electrode G extending from the gate line G1, and may include a gate insulating film GI formed on the first substrate SUBS1 on which the gate line G1 including the gate electrode G is formed, and a semiconductor pattern A overlapping a portion of the gate electrode G and formed on the gate insulating film GI.

The semiconductor pattern A forms an active area of a thin film transistor TFT, and the semiconductor pattern A may be formed with amorphous silicon (a-Si) or an oxide semiconductor such as zinc oxide (ZnO), for example Indium Gallium Zinc Oxide (IGNO), Zinc Tin Oxide (ZTO), Zinc Indium Oxide (ZIO) and so on, without being limited thereto.

In addition, the touch type display panel may include data lines D1 and D2 crossing the gate line G1 and insulated from the gate line G1 by the gate insulating film GI, and the thin film transistor TFT including a source electrode S extending from the data lines D1 and D2 and a drain electrode D facing the source electrode S, and the touch type display panel includes pixel electrodes P11 and P12 formed in an area defined by the cross of the gate line G1 and the data line D1 and connected to the drain electrode D of the thin film transistor TFT.

In addition, the touch type display panel may include an interlayer insulating film INS formed on the whole surface of the gate insulating film GI on which the data lines D1 and D2, the transistor TFT and the pixel electrodes P11 and P12 are formed, a first signal line TY11 and a second signal line TY12 as touch driving lines formed on the interlayer insulating layer INS and overlapping the data lines D1 and D2. Here, the first signal line TY11 and the second signal line TY12 may be formed with low resistance metal such as aluminum (Al), aluminum-neodymium (AlNd), copper (Cu), molybdenum (Mo), molybdenum titanium (MoTi), chrome (Cr) etc., or alloy thereof, but it is not limited thereto.

In addition, the touch type display panel includes a passivation film PL formed on the whole surface of the interlayer insulating film INS on which the first signal line TY11 and the second signal line TY12 are formed, and a common electrode (a touch electrode) C11 formed on the passivation film PL. The common electrode (the touch electrode) C11 may be connected to the second signal line TY12 through a contact hole CH formed through the passivation film PL.

At this time, the gate line G1 or a gate metal layer of the gate electrode G or a source/drain metal layer may be material of at least one of aluminum (Al), aluminum alloy (AlNd), copper (Cu), copper alloy, molybdenum (Mo) and molybdenum alloy (MoTi) as metal material having low resistance characteristic.

In addition, in the present exemplary embodiment, the touch electrode or the common electrode used as the touch unit sensor may be a transparent electrode, and the touch electrode or the common electrode may be formed with transparent conductive material of which work function is comparatively great, for example, metal oxide such as indium-tin-oxide (ITO) or indium-zinc-oxide (IZO), and combination of metal such as ZnO:Al or SnO2:Sb and oxide.

In addition, the gate insulating film GI, the interlayer insulating film INS and the passivation film PL and so on may be formed with inorganic insulating material such as oxide silicon (SiO2) or nitride silicon (SiNx) and so on, but it is not limited thereto, and the gate insulating film GI, the interlayer insulating film INS and the passivation film PL may also be formed with other electrically insulating material.

In addition, each of the gate insulating film GI, the interlayer insulating film INS and the passivation film PL is shown as a single layer, but each of the gate insulating film GI, the interlayer insulating film INS and the passivation film PL may have a plurality of layers formed with different materials, and at least one layer may be omitted in some cases.

In the above, for a convenience, the touch type display device according to the various exemplary embodiments is illustrated as a liquid crystal display device, but the present invention is not limited thereto, the present invention may be applied to various display devices such as an electric field emission display device, a plasma display panel, an electroluminescence display device, an organic light emitting diode display device, an electrophoretic display device and so on.

In addition, in FIGS. 8A and 8B, for a convenience, a horizontal electric field driving method such as an in plane switching (IPS) mode and a fringe field switching (FFS) mode of which an electrode performing a function of the common electrode and the touch electrode is formed on a lower substrate of the panel on which a pixel electrode is formed is illustrated as an example, but the present invention is not limited thereto, and the present invention may be applied to various structures such as a twisted nematic (TN) mode and a vertical alignment (VA) mode of which the touch electrode is formed in an upper substrate.

According to the embodiments described above, the touch electrode is divided into the basic touch unit sensor of the basic area and the variable touch unit sensor of the variable area, the touch electrode arrangement is designed so that the area difference between the basic area and the variable area is minimized, and thus there is effect of maintaining touch performance uniformly.

That is, the size of the variable touch unit sensor decreases in the vertical direction when the size of the variable touch unit sensor increases in the horizontal direction, in comparison with the basic touch unit sensor, on the contrary, the size of the variable touch unit sensor decreases in the horizontal direction when the size of the variable touch unit sensor increases in the vertical direction, in comparison with the basic touch unit sensor, as a result, the area deviation of the variable touch unit sensor and the basic touch unit sensor is minimized and thus superior touch performance may be provided.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the exemplary embodiments of the present invention disclosed herein are intended to illustrate the scope of the technical idea of the present invention, and the scope of the present invention is not limited by the exemplary embodiments. The scope of the present invention should be interpreted by claims attached thereto, and it should be interpreted that all technical spirits within the scope equivalent to the claims pertain to the scope of the present invention.

What is claimed is:

1. A display panel of a display device, the display panel comprising:

a touch electrode including a plurality of first touch unit sensors and a plurality of second touch unit sensors formed around the first touch unit sensors, the plurality of first touch unit sensors having a first length and a first width, and the plurality of second touch unit sensors having a second length that is distinct from the first length of the plurality of first touch unit sensors and a second width that is distinct from the first width of the plurality of first touch unit sensors;

wherein the second length of the plurality of second touch unit sensors is smaller than the first length of the plurality of first touch unit sensors if the second width of the plurality of second touch unit sensors is larger than the first width of the plurality of first touch unit sensors; and wherein the second length of the plurality of second touch unit sensors is larger than first length of the plurality of first touch unit sensors if the second width of the plurality of second touch unit sensors is smaller than the first width of the plurality of first touch unit sensors.

2. The display panel of claim 1, wherein the plurality of first touch unit sensors are formed in a central area of the display panel, and the plurality of second touch unit sensors are formed at corners of the active area of the display panel.

3. The display panel of claim 2, wherein the corners of the active area include a first corner to the upper left of the central area in which the plurality of first touch unit sensors are formed, a second corner to the lower left of the central area in which the plurality of first touch unit sensors are formed, a third corner to the upper right of the central area in which the plurality of first touch unit sensors are formed, and a fourth corner to the lower right of the central area in which the plurality of first touch unit sensors are formed.

4. The display panel of claim 1, wherein the second width of the plurality of second touch unit sensors is larger or smaller than the first width of the plurality of first touch unit sensors by one pixel and the second length of the plurality of second touch unit sensors is larger or smaller than the first length of the plurality of first touch unit sensors by one pixel.

5. The display panel of claim 1, wherein a number of horizontal channels where the plurality of second touch unit sensors are formed is determined based on a difference between a horizontal resolution of the display device and a product of the number of horizontal channels and the first width of the plurality of first touch unit sensors.

6. The display panel of claim 1, wherein a first portion of horizontal channels include a first plurality of second touch unit sensors is formed to the left of a central area including the plurality of first touch unit sensors and a second portion of horizontal channels include a second plurality of second touch unit sensors formed to the right of the central area, and wherein an amount of channels in the first portion and the second portion of the horizontal channels is the same.

7. The display panel of claim 6, wherein a first portion of the vertical channels include a first plurality of second touch unit sensors formed above the central area including the first touch unit sensors and a second portion of the horizontal channels include a second plurality of second touch unit sensors formed below the central area, and wherein an amount of channels in the first portion and the second portion of the vertical channels is the same.

8. The display panel of claim 1, wherein a first portion of horizontal channels include a first plurality of second touch unit sensors formed to the left of a central area include the plurality of first touch unit sensors and a second portion of horizontal channels include a second plurality of second touch unit sensors formed to the right of the central area, and wherein an amount of channels in the first portion and the second portion of the horizontal channels is different.

9. The display panel of claim 8, wherein a first portion of vertical channels include a first plurality of second touch unit sensors formed above the central area including the first touch unit sensors and a second portion of the horizontal channels include a second plurality of second touch unit sensors formed below the central area, and wherein an amount of channels in the first portion and the second portion of the vertical channels is different.

10. The display panel of claim 1, wherein the first width of the plurality of first touch unit sensors is equivalent to or greater by one pixel than a first quotient of a number of pixels formed in the horizontal direction of the display panel and a total number of first touch unit sensors and second touch unit sensors formed in the horizontal direction, and wherein the first length of the plurality of first touch unit sensors is equivalent to or greater by one pixel than a second quotient of a number of pixels formed in the vertical direction and a total number of first touch unit sensors and second touch unit sensors formed in the vertical direction.

11. The display panel of claim 1, wherein the first width of the plurality of first touch unit sensors is smaller than the second width of the plurality of second touch unit sensors by one pixel and the first length of the plurality of first touch unit sensors is larger than the second length of the plurality of second touch unit sensors by one pixel.

12. The display panel of claim 1, wherein the first width of the plurality of first touch unit sensors is larger than the second width of the plurality of second touch unit sensors by one pixel and the first length of the plurality of first touch unit sensors is smaller than the second length of the plurality of second touch unit sensors by one pixel.

13. The display panel of claim 1, wherein the first width of the plurality of first touch unit sensors is smaller than second width of the plurality of second touch unit sensors by two pixels and the first length of the plurality of first touch unit sensors is larger than the second length of the plurality of second touch unit sensors by two pixels.

14. The display panel of claim 1, further comprising:
a plurality of third touch unit sensors having a third width that is the same as the first width of the plurality of first touch unit sensors and a third length that is the same as the second length of the plurality of second touch unit sensors; and
a plurality of fourth touch unit sensors having a fourth width that is the same as the second width of the plurality of second touch unit sensors and a fourth length that is the same as the first length of the plurality of first touch unit sensors.

15. The display panel of claim 14, wherein a first portion of the plurality of third touch unit sensors is formed above the plurality of first touch unit sensors and between a first portion of the plurality of second touch unit sensors, and wherein a second portion of the plurality of third touch unit sensors is formed below the plurality of first touch unit sensors and between a second portion of the plurality of second touch unit sensors, and wherein a first portion of the plurality of third touch unit sensors is formed to the left of the plurality of first touch unit sensors and between a third portion of the plurality of second touch unit sensors and wherein a second portion of the plurality of third touch unit sensors is formed to the right of the plurality of first touch unit sensors and between a fourth portion of the plurality of second touch unit sensors.

16. A display panel for a display device comprising an active area, the active area including a number of pixels formed in a horizontal direction and a number of pixels formed in a vertical direction, the display panel comprising:
a touch electrode formed with a number of touch unit sensors in the active area, the touch unit sensors including a number of horizontal channels of the touch unit sensors in the horizontal direction and a number of vertical channels of the touch unit sensors in the vertical direction,
wherein the touch unit sensor comprises a number of basic touch unit sensors formed in an area of the active area of the display panel, and variable touch unit sensors formed in the active area around the basic touch unit sensors,
wherein the basic touch unit sensors have a size of a basic horizontal unit pixel number and a basic vertical unit pixel number, and the variable touch unit sensors have a size of a variable horizontal unit pixel number and a variable vertical unit pixel number, and
wherein the variable vertical unit pixel number is smaller than the basic vertical unit pixel number if the variable horizontal unit pixel number is larger than the basic horizontal unit pixel number, and
wherein the variable vertical unit pixel number is larger than the basic vertical unit pixel number if the variable horizontal unit pixel number is smaller than the basic horizontal unit pixel number.

17. The display panel of claim 16, wherein the basic touch unit sensors are formed in a central area of the active area of the display panel, and the variable touch unit sensors are formed at corners of the active area of the display panel, wherein the corners of the active area include a first corner to the upper left of the central area in which the basic touch unit sensors is formed, a second corner to the lower left of the central area in which the basic touch unit sensors is formed, a third corner to the upper right of the central area in which the basic touch unit sensors is formed, and a fourth to the lower right of the central area in which the basic touch unit sensors is formed.

18. The display panel of claim 16, wherein the basic horizontal unit pixel number is smaller than the variable horizontal unit pixel number by one pixel and the basic vertical unit pixel number is larger than the variable vertical unit pixel number by one pixel.

19. The display panel of claim 16, wherein the basic horizontal unit pixel number is larger than the variable horizontal unit pixel number by one pixel and the basic vertical unit pixel number is smaller than the variable vertical unit pixel number by one pixel.

20. The display panel of claim 16, wherein the basic horizontal unit pixel number is smaller than the variable horizontal unit pixel number by two pixels and the basic vertical unit pixel number is larger than the variable vertical unit pixel number by two pixels.

* * * * *